US006839772B1

(12) United States Patent
Kowalski et al.

(10) Patent No.: US 6,839,772 B1
(45) Date of Patent: Jan. 4, 2005

(54) CHIP CARD READER HAVING CONTACT AND CONTACTLESS OPERATING MODES

(75) Inventors: Jacek Kowalski, Aix en Provence (FR); Bruno Charrat, Aix en Provence (FR)

(73) Assignee: Inside Technologies, Saint Clement les Places (FR)

( * ) Notice: Subject to any disclaimer, the term of this patent is extended or adjusted under 35 U.S.C. 154(b) by 0 days.

(21) Appl. No.: 09/786,557
(22) PCT Filed: Sep. 2, 1999
(86) PCT No.: PCT/FR99/02083
§ 371 (c)(1), (2), (4) Date: May 21, 2001
(87) PCT Pub. No.: WO00/14672
PCT Pub. Date: Mar. 16, 2000

(30) Foreign Application Priority Data
Sep. 4, 1998 (FR) .......................... 98 11443

(51) Int. Cl.[7] .............................................. G06F 3/00
(52) U.S. Cl. ................. 710/5; 710/5; 710/14; 710/41; 710/63; 710/65; 712/405
(58) Field of Search ................ 710/5, 14, 41, 710/63, 65, 2, 1, 11, 32, 36; 712/405; 705/1, 5, 14, 41, 63, 65; 713/200; 235/492

(56) References Cited

U.S. PATENT DOCUMENTS

| 5,594,233 A | * | 1/1997 | Kenneth et al. ............. 235/492 |
| 5,613,159 A | * | 3/1997 | Colnot ......................... 710/11 |
| 5,714,741 A | * | 2/1998 | Pieterse et al. .............. 235/380 |
| 5,721,781 A | * | 2/1998 | Deo et al. ..................... 705/67 |
| 5,799,171 A | | 8/1998 | Kondou ....................... 395/500 |
| 6,041,412 A | * | 3/2000 | Timson et al. ............... 713/200 |
| 6,045,043 A | * | 4/2000 | Bashan et al. ............... 235/441 |
| 6,101,477 A | * | 8/2000 | Hohle et al. ................... 705/1 |
| 6,168,083 B1 | * | 1/2001 | Berger et al. ................ 235/492 |
| 6,557,752 B1 | * | 5/2003 | Yacoob ....................... 235/375 |
| 2001/0018660 A1 | * | 8/2001 | Sehr ............................. 705/5 |

FOREIGN PATENT DOCUMENTS

| FR | 2 752 076 | 2/1998 |
| FR | 2 701 133 | 8/1998 |
| WO | WO 97/46964 | 12/1997 |

* cited by examiner

Primary Examiner—Kim Huynh
Assistant Examiner—Angel L. Casiano
(74) Attorney, Agent, or Firm—Patterson, Thuente, Skaar & Christensen, P.A.

(57) ABSTRACT

The invention relates to a chip card reader (10) comprising a central processing unit (20) comprising means (MP2, MEM2, PG20, 23) for emitting and receiving, on a communication bus (60), binary messages with a first format determined by a communication protocol for contact chip card, a card receiving device (40) comprising a contact card connector (42) connected to the central processing unit (20) by means of the communication bus (60), and a read head (30) for contactless chip card (53) comprising a serial interface (31). According to the invention, the serial interface (31) of the contactless read head (30) is directly connected at least to a data wire (I/O) of the communication bus, and the contactless read head (30) is arranged in a hardware and/or software way so that it does not respond to a contact chip card activation command and responds to a specific activation command (ACTIV) different from a contact chip card activation command.

7 Claims, 2 Drawing Sheets

CHIP CARD READER HAVING CONTACT AND CONTACTLESS OPERATING MODES

BACKGROUND OF THE INVENTION

1. Field of the Invention

The present application claims priority to French patent application 98 11443, filed Sep. 4, 1998, according to 35 U.S.C. 119(a)–(d).

2. Description of the Related Art

In the past few years, there has been developed and designed integrated circuits called "contactless", arranged to receive or transmit messages using electromagnetic induction by means of an antenna coil. Such integrated circuits are for example described in the international applications WO 98/02840, WO 98/02980, WO 98/05123, WO 98/06057, WO 98/06056 of the applicant. These circuits allow contactless chip cards to be provided, which should progressively replace conventional contact cards.

In view of the important number of contact card readers existing in the market, the question quickly arose to know how the passage from the contact card technology to the contactless card technology could be done in a simple and rational way, without being necessary to replace all the existing readers and all the contact cards held by users.

There have thus been proposed chip cards with two operating modes, or hybrid cards, comprising both contact zones and an antenna coil. The applications WO 98/06057 and WO 98/59319 of the applicant relate to such hybrid cards.

However, hybrid cards having a substantially higher cost price than the two other types of cards, it is probable that contact cards will continue to be commercialized. Thus, the market of chip cards will comprise, in a near future, contactless card readers, contact card readers, contact cards, contactless cards and hybrid cards.

In order to decrease the total number of chip card readers, one has thus also thought to design readers with two operating modes, able to equally interact with contact chip cards and with contactless chip cards.

The application WO 97/46964 describes such a reader, comprising [FIG. 10] a read head [50] for a contactless chip card and a read head [28] for a contact chip card, both heads being connected to the communication bus [62] of the central processing unit [64] of the reader by means of a multiplexer [61]. According to the position of the multiplexer [61], the central processing unit [64] is thus connected to the contactless read head [50] or to the contact read head [28].

OBJECTS AND SUMMARY OF THE INVENTION

The present invention has the object of providing an alternative to this conventional structure of card reader with two operating modes.

A more particular object of the present invention is to provide a card reader with two operating modes which can be implemented in a simple way from a conventional contact card reader, without requiring a significant hardware modification of the reader.

This object is achieved by a chip card reader comprising a central processing unit comprising means for emitting and receiving, on a communication bus, binary messages having a first format determined by a communication protocol for contact chip card, a card receiving device comprising a contact card connector connected to the central processing unit by means of the communication bus, and a read head for contactless chip card comprising a serial interface, wherein the serial interface of the contactless read head is directly connected at least to a data wire of the communication bus, and the contactless read head is arranged in a hardware and/or software way so as not to respond to a contact chip card activation command received on the serial interface, and to respond to a specific activation command of the contactless read head different from a contact chip card activation command.

According to one embodiment, the contactless read head is further electrically supplied by a supply wire of the communication bus.

According to one embodiment, the contactless read head comprises means for being set into an inhibition state at its power-on, and for leaving the inhibition state when receiving the specific activation command.

According to one embodiment the central processing unit comprises means for performing the following operations when receiving a detection signal of the presence of a card in the reader: sending, on the communication bus, a contact card activation command, and waiting for a first response; if the first response is received, establishing or trying to establish a communication with a contact card; if the first response is not received in a predetermined time interval, sending the specific activation command of the contactless read head on the communication bus, and waiting for a second response; if the second response is received, establishing or trying to establish a communication with a contactless card.

According to one embodiment, the contact card activation command is a reset command according to the standard ISO 7816.

According to one embodiment, the specific activation command of the read head is a command which is likely to be never sent to a contact chip card.

According to one embodiment, the specific activation command of the read head is a signal sent on at least one wire of the communication bus which is not used by contact chip cards.

According to one embodiment, the contactless read head comprises means for converting messages received with the first format on the serial interface into messages having a second format determined by a communication protocol for contactless chip cards and, vice versa, converting messages received with the second format into messages with the first format.

According to one embodiment, the contactless read head is integrated in a small size circuit arranged close to or inside the receiving card device.

The present invention also relates to a read head for contactless chip card, comprising a serial interface for receiving or emitting messages with a first format determined by a communication protocol for contact chip card, and means for being set into an inhibition state at its power-on, and for leaving the inhibition state when receiving a specific activation command received on the serial interface.

According to one embodiment, the inhibition state is so that the read head does not respond to any command except to the activation command of the read head.

According to one embodiment, the inhibition state is so that the read head does not respond to any command except to the activation command of the read head or a chip card activation.

According to one embodiment, the read head comprises means for returning to the inhibition state when receiving a deactivation command received on the serial interface.

According to one embodiment, the read head comprises means for converting messages received with the first format on the serial interface into messages having a second format determined by a communication protocol for contactless chip card, and, vice versa, converting messages received with the second format into messages with the first format and responding to a specific activation command of the contactless read head different from a contact chip card activation command.

BRIEF DESCRIPTION OF THE DRAWINGS

These objects, characteristics and advantages, as well as others of the present invention will be described with more details in the following description of an embodiment of a chip card reader and a contactless read head according to the invention, in conjunction with the accompanying drawings in which.

DESCRIPTION OF THE PREFERRED EMBODIMENTS

Figure 1:
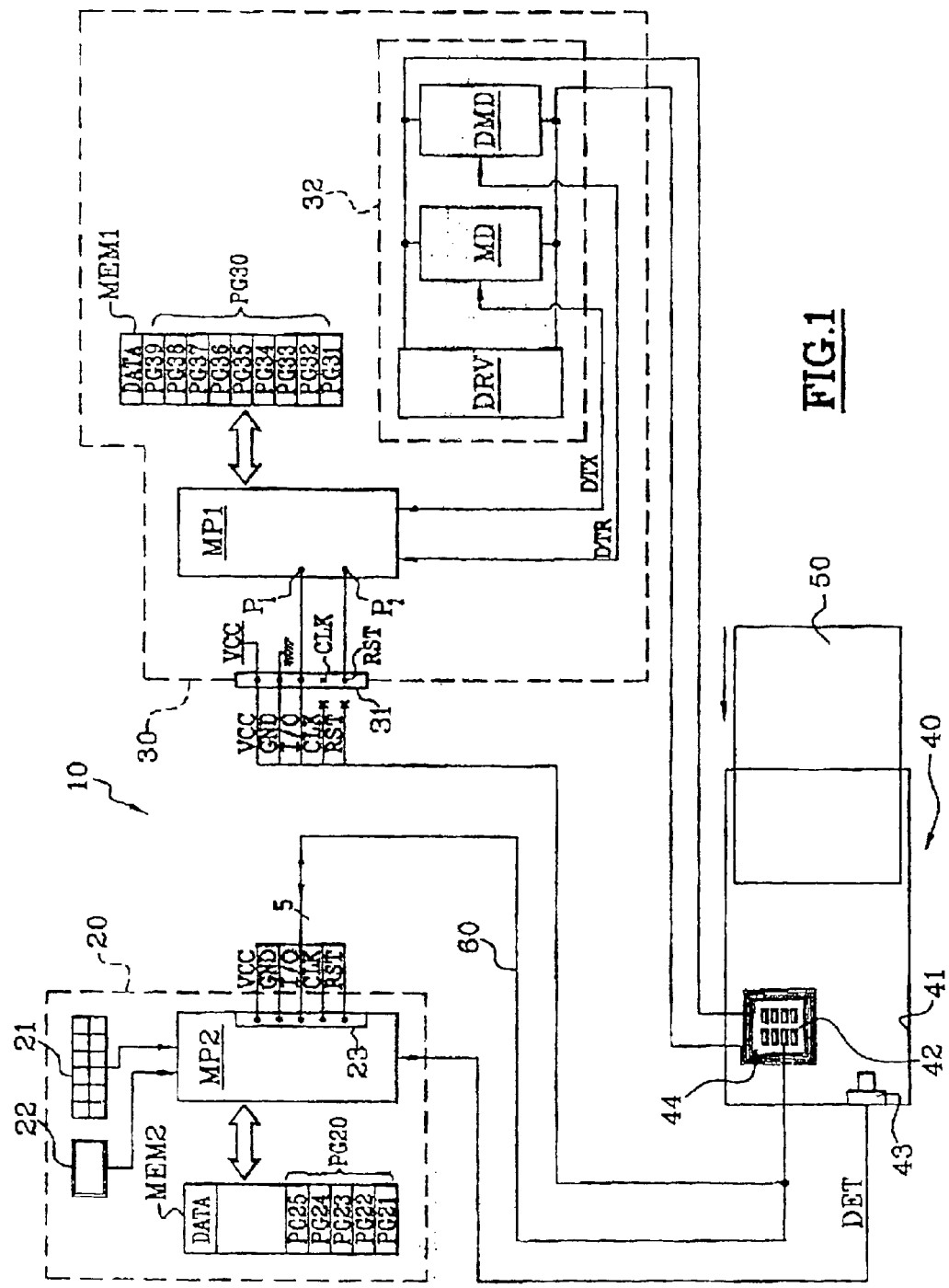
FIG. 1 shows in block form the electric architecture of a chip card reader and of a contactless read head according to the invention.

FIG. 1 show a car reader 10 according to the invention, which conventionally comprises:

a central processing unit 20, an internal communication bus 60, here of the type ISO 7816, comprising a supply wire VCC, a ground wire GND, a data wire I/O, a clock wire CLK, and a reset wire RST, and a card-receiving device 40 provided with an electric connector 42 for contact chip cards.

Device 40 conventionally comprises a receptacle 41 for receiving a card 50 and is provided with any manual or automatic insertion mechanism (not shown). Inside receptacle 41 is located a conventional connector 42, a friction or a landing connector, as well as an excursion end detector 43 providing a signal DET when a card is inserted. Connector 42 comprises various contact members for contacting a chip card, for example pins or metallic blades, each being connected to one of the wires of communication bus 60.

According to the invention, reader 10 comprises a read head 30 for contactless chip card comprising a serial interface 31 directly connected to communication bus 60, without passing through a multiplexer or any other equivalent switching means. Read head 30 is furthermore connected to an antenna coil 44 arranged here close to connector 42, in card receiving device 40.

According to the invention, contactless read head 30 presents various software and hardware features which will now be described, enabling read head 30 to be directly connected to bus 60, for providing a reader with two operating modes in a simple and low cost way, without being necessary to change either the hardware structure of central processing unit 20 or the software that it uses to manage the communications with contact cards.

Read head 30 has a per se conventional structure, and comprises a microprocessor MP1, a memory MEM1, the serial interface 31 and a contactless communication interface 32.

Contactless interface 32 conventionally comprises a driver circuit DRV, a modulator circuit MD and a demodulator circuit DMD, connected to the terminals of coil 44. Circuit DRV delivers an alternating excitation signal with a standard frequency of 125 kHz or 13.56 MHz. Circuit MD modulates the excitation signal according to messages DTX to be transmitted, supplied by microprocessor MP1. Circuit DMD demodulates the excitation signal for extracting messages DTR received by load modulation and inductive coupling. The messages DTR are supplied to microprocessor MP1.

Serial interface 31 comprises ISO 7816 terminals I/O, VCC, GND, CLK, RST. It is connected to the wires I/O, VCC and GND of bus 60 and is here not connected to the wires RST and CLK. Terminal I/O is connected to an input/output port P1 of microprocessor MP1. Terminal RST, although not connected to wire RST, may however be connected to a port P2 of microprocessor MP1 for providing an embodiment which will be described hereafter.

Advantageously, terminal VCC, connected to the corresponding wire of bus 60, is here used as a voltage supply node of the whole read head 30.

Moreover, memory MEM1 comprises data (DATA) and a program PG30 having a conventional layered structure, program PG30 comprising various sub-routines PG31 to PG39 described by table 1 hereafter.

TABLE 1

| (content of memory MEM1) | |
|---|---|
| PG39 | Management program of the inhibited/active state |
| PG38 | Management program of serial interface 31 |
| PG37 | Conversion program from protocol $P_{CTL}$ to protocol ISO 7816 |
| PG36 | Conversion program from protocol ISO 7816 to protocol $P_{CTL}$ |
| PG35 | Security management program |
| PG34 | Enciphering Algorithm |
| PG33 | Decoding algorithm of messages DTR |
| PG32 | Coding algorithm of messages DTX |
| PG31 | Operating system of microprocessor MP1 |

Programs PG32 and PG33, per se conventional, respectively provide the coding of the messages DTX sent to a contactless card and the decoding of the messages DTR received from the card. Program PG35 manages the authentication procedures of contactless cards, and uses program PG34 for generating enciphered authentication binary words. Program PG36 provides the conversion of the messages received with the format ISO 7816-4 on serial interface 31 into messages having a format defined by the contactless communication protocol, which will be called $P_{CTL}$. This protocol having been not yet the object of standardization, each integrated circuit designer is, to date, free to choose the protocol which is, according to him, the best appropriate. Thus, by way of a non-limiting example, the format $P_{CTL}$ provided by the applicant for sending commands to a contactless card comprises the four following bytes:

CODE: command code

ADD: address in the card memory

CRC1: first signature byte

CRC2: second signature byte

In this case, the commands ADPU provided by the standard ISO 7816-4, received with the following format:

| CLA | INS | P1 | P2 | Lc | DATA | Le |
|-----|-----|----|----|----|------|-----| are converted into commands of the above-cited type, and vice versa.

To aid in better understanding, an ISO command of the type READ comprising the following bytes (expressed in hexadecimal):

CLA=$80_h$ (proprietor class)

INS=$B2_h$ (read command)

P1=$xx_h$ (number of the block to be read)

P2=$04_h$ (default parameter)

L=3 (number of bytes to be read)

is converted into a command $P_{CTL}$ of the type:

CODE=30h

Address=xx/4

CRC1

CRC2

It can be seen here that the format conversion may relate not only to the format of the commands but also to the codes of the commands and the values of the address fields, depending on the requirements of the application and the structure of the memory of the contactless card which is used.

Complementarily, program PG37 converts the messages received with the format $P_{CTL}$ by contactless interface 32 into ISO 7816-4 responses of the type:

| (Body) | (suffix 1) | (suffix 2) |
|--------|------------|------------|
| Data field | SW1 | SW2 | these commands being sent on bus 60 by means of serial interface 31.

On the other hand, program PG38 is a program which supervises the overall operation of read head 30 and coordinates the other programs PG32 to PG37, allowing furthermore the programming of some options of read head 30 and some state registers of microprocessor MP1. In a general way, program PG38 sends always a response on bus 60, for example an error message when a command has not been performed by a contactless card.

According to the invention, program PG39 is provided to prevent that program PG38 controls serial interface 31 at power-on of read head 30, as long as a specific activation command has not been sent to the read head. Program PG39 keeps read head 30 in an inhibited state as long as that the activation command has not been received, the inhibition state being defined by the fact that the read head does not emit any response to a command received on serial interface 31, except the already mentioned activation command.

Table 2 hereafter schematically describes the operation of program PG39 and shows how the latter switches to program PG38 when the activation command is received. The steps beginning by number 39 are steps of program PG39, and those beginning by number 38 relate to program PG38. When a connection is not provided (right column of the table), the next performed step is the step that immediately follows the current step. Furthermore, providing a deactivation command may be considered as optional if the supply voltage VCC on bus 60 is suppressed at the end of a contactless communication.

TABLE 2

(programs PG39 and PG38)

| Step | Operation | Connection |
|------|-----------|------------|
| 39.1 | Start/power-on | |
| 39.2 | Command received? | No: return to 39.2 |
| 39.3 | Received command = ACTIV | No: return to 39.2 |
| 39.4 | Send response: OK-ACTIV | Go to 38.1 |
| 39.5 | (Return from PG38) Received command = DEACTIV | Yes: go to 39.2 No: return to 38.1 |
| 39.6 | Send response OK-DEACTIV | |
| 38.1 | Command received? (Temporization) | No: go to 39.5 |
| 38.2 | Perform command or transmit command with $P_{CTL}$ format to contactless interface 32 | |
| 38.3 | Send ISO response on bus 60 or send back with ISO format a response received from a contactless card | |
| 38.4 | End of communication? | Yes: go to 39.5 No: go to 38.1 |

According to the invention, the activation ACTIV and the deactivation DEACTIV commands received with the ISO format are preferably commands of a type never sent or likely to be never sent to a contact card by central processing unit 20. In other terms, the series of bits forming these commands must not be present in the set of existing commas for contact cards. They are for example commands forbidden by the standard ISO 7816 (forbidden CLA, forbidden INS . . . ) or comma incorporating a specific series of bytes having a very small probability of being used during a communication with a contact card.

To aid in better understanding, there will be found hereafter examples of ISO commands which can be selected as activation and deactivation commands.

Activation Command:

CLA=$8E_h$ (proprietor class)

INS=$AA_h$ (code of the command ACTIV)

P1=$55_h$

P2=$BC_h$

L=0 (no parameter required in response)

Deactivation Command:

CLA=$8E_h$

INS=$AD_h$ (code of the command DEACTIV)

P1=$55_h$

P2=$BC_h$

L=0 (no parameter required in response)

In an alternative embodiment, the activation or deactivation commands may also have the form of one or more pulses or signals sent on one or more wires of communication bus 60, different from the wires VCC, GND, RST, CLK, I/O, such wires being provided by the standard ISO 7816 but generally not used by contact chip cards.

Finally, the read head according to the invention does not respond to ISO commands passing on bus 60 as long as the read head is in the inhibited state. The risks of collision with responses sent on bus 60 by a contact card are thus prevented.

The operation of reader 10 according to the invention will be better understood when reading the following description of central processing unit 20.

Central processing unit 20, with a per se conventional structure, basically comprises a microprocessor MP2, a memory MEM2 and, if necessary, a keyboard 21 and a display screen 22. Microprocessor MP2 comprises a serial port 23 connected to the wires VCC, GND, I/O, CLK and RST of communication bus 60.

Memory MEM2 comprises data (DATA) and a layered program PG20 comprising various sub-routines PG21 to PG25 described by table 3 hereafter.

TABLE 3

(content of memory MEM2)

| | |
|---|---|
| PG25 | Selection program of the operating mode |
| PG24 | Application program of the contactless mode |
| PG23 | Application program of the contact mode |
| PG22 | Management of the communication protocol ISO 7816 |
| PG21 | Operating system of microprocessor MP2 |

Program PG22, or "protocol" layer of the software of the reader, is a conventional program providing the setting in ISO form of the commands as well as the management of the communications. The application program PG23, also conventional, is provided for managing a transaction with a contact card. In practice, central processing unit 20 may use a plurality of application programs PG23 in order to be able to interact with a plurality of contact cards from different origins, each card manufacturer defining its own set of commands while complying with the recommendations of the ISO standard. In this case, a program for recognizing the inserted card and for selecting the corresponding application program will be provided, as well known by those skilled in the art.

Application program PG24, per se conventional, allows the management of a contactless communication. Here also, this program depends on the set of commands used by the contactless card and its manufacturer. Several contactless application programs are thus likely to coexist in memory MEM2.

According to the invention, program PG25 allows the selection of the reader's operating mode and the activation, if necessary, of read head 30. The operation of program PG25 is summarized by table 4 hereafter. The steps beginning by the numbers 23, 24 and 25 relate respectively to the programs PG23, PG24 and PG25. The priority is given to a contact mode dialogue. If no contact card responds to the activation command ISO 7816, i.e. to the passage to 1 or 0 of the signal RST on bus 60, central processing unit 20 activates read head 30 and tries to establish a communication with a contactless card. If the attempt fails, an error message is sent to the user.

TABLE 4

(programs PG23, PG24 and PG25)

| Step | Operation | Connections |
|---|---|---|
| 25.1 | Start/power-on | |
| 25.2 | Card inserted? (Signal DET received?) | Yes: go to 23.1<br>No: return to 25.2 |
| 25.3 | Send the command ACTIV (activation of read head 30) | Go to 24.1 |
| 25.4 | Send an error message: card not present or wrong side up | |
| 25.5 | Send the command DEACTIV (deactivation of read head 30) | Go to 25.2 |
| 23.1 | Search for a communication with a contact card: reset on wire RST | |
| 23.2 | Response ISO 7816 to reset received? (Communication established?) | No: go to 25.3 |
| 23.3 | Dialogue in contact mode | |
| 23.4 | End of dialogue | Go to 25.2 |

TABLE 4-continued (programs PG23, PG24 and PG25)

| Step | Operation | Connections |
|---|---|---|
| 24.1 | Search for a communication with a contactless card | |
| 24.2 | Communication established? | No: go to 25.4 |
| 24.3 | Dialogue in contactless mode | |
| 24.4 | End of dialogue | Go to 25.5 |

Of course, the present invention is likely to have various alternatives and embodiments. In particular, the fact that the read head does not respond to an ISO 7816 reset command does not necessarily imply that such a response is not provided in program PG39. By way of example, table 5, hereafter, describes an alternative of program PG39, in which steps 39.31 to 39.34 are provided to that effect. In that case, it is imperative that terminal RST of interface 31 is not connected to wire RST of bus 60, so that the steps 39.31 to 39.34 are never performed. In reality, these steps are provided to enable read head 30 to respond to an ISO reset command in the context of the design of an exclusively contactless reader. Such an alternative embodiment of program PG39 renders read head 30 polyvalent and adapted to any type of applications.

TABLE 5

(alternative to steps 39.1 to 39.3)

| Step | Operation | Connection |
|---|---|---|
| 39.1 | Start/Power-on | |
| 39.2 | Command received? | No: return to 39.2 |
| 39.3 | Received command = ACTIV | No: go to 39.32 |
| 39.4 | Send response: OK-ACTIV | Go to 38.1* |
| 39.31 | Received command = ISO reset? | No: return to 39.2 |
| 39.32 | Send an activation message $P_{TCL}$ of a contactless card | |
| 39.33 | Response of contactless card received? | No: return to 39.2 |
| 39.34 | Send standard response ISO 7816-2 | Go to 38.1* |

(*See Table 2)

It will be apparent from the foregoing that reader 10 according to the invention is capable of reading any type of chip card present in receiving device 40.

Figures 2A, 2B, 2C:
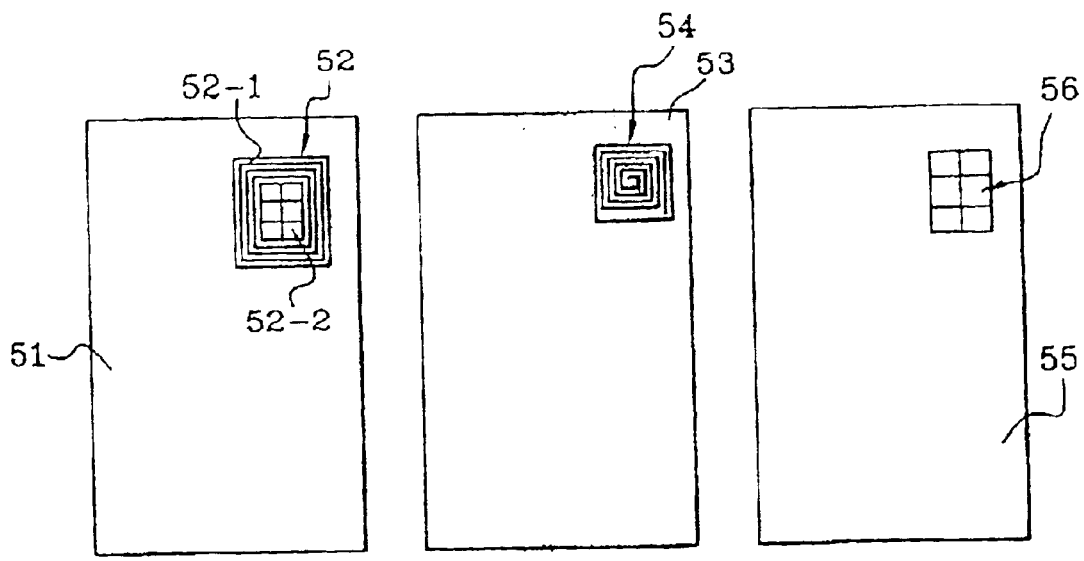
FIGS. 2A to 2C show various examples of cards which can be read by the reader of FIG. 1.

To aid in better understanding, FIGS. 2A to 2C show three types of conventional cards which can be read. FIG. 2A shows a hybrid card 51 provided with a micro-unit 52 comprising both contact zones 52-2 and a coil 52-1. FIG. 2B shows a card 53, which is contactless only, provided with a micro-unit 54 comprising a coil only, and FIG. 2C shows a card 55 operating with contact only, provided with a micro-unit 56 comprising contact zones only.

However, as already mentioned, the advantages of the invention are not limited to the design of a reader with two operating modes but relate also to the transformation of a conventional card reader into a reader with two operating modes. Thus, it will be apparent from the foregoing that the addition of read head 30 to a contact card reader requires only the addition of programs PG24 and PG25 in memory MEM2.

Further, contactless read head 30 may be added in a simple way in a reader without being necessary to modify the hardware structure of the reader and card-receiving device 40. It is sufficient, in practice, to connect serial interface 31 of read head 30 to communication bus 60, for example by means of a pin and socket connector arranged between the connector of central processing unit 20 and the connector of bus 60, or also doing in the way described here-after, for providing a reader with two operating modes.

Figure 3:
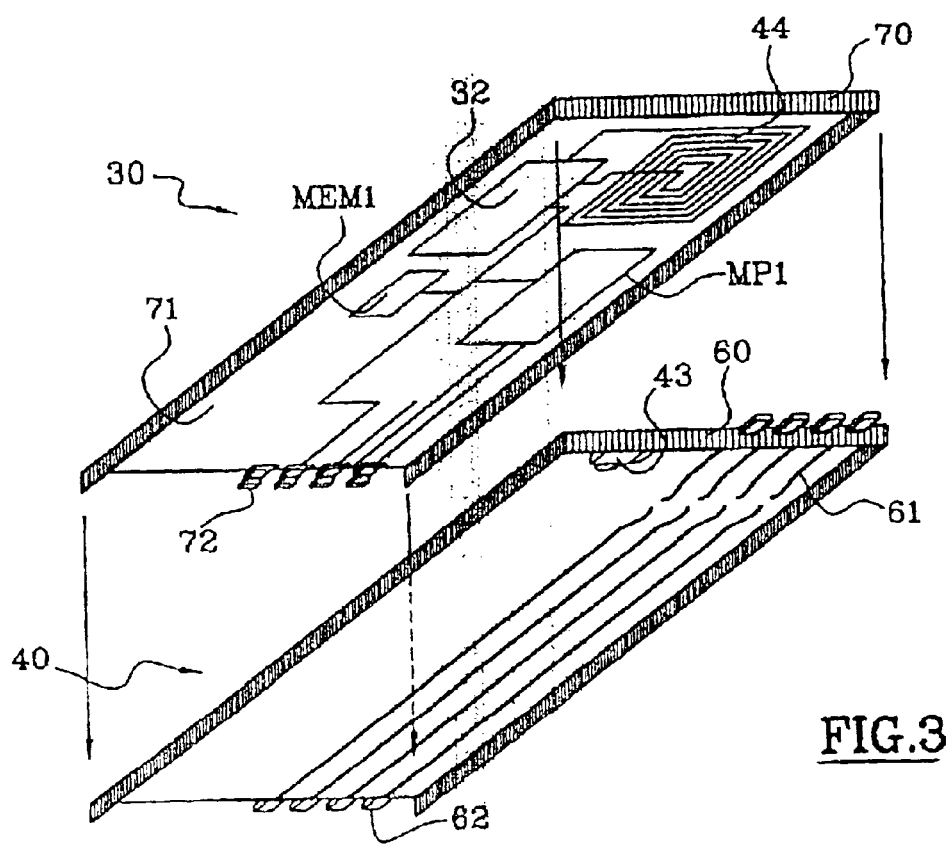
FIG. 3 is an exploded view of an embodiment of a card-receiving device according to the invention.

FIG. 3 shows a simple example of adapting a conventional contact card reader, and providing a reader with two operating modes according to the invention. Card receiving device 40 conventionally comprises a housing of plastic 60 for receiving a card, represented by a bottom view without the bottom of the housing. The housing comprises flexible blades 61 which are curved in order to form a friction connector. Blades 61 extend outside housing 60 to form connection pins 62 to be welded on a printed circuit board.

Antenna coil 44 and the other elements (MP1, MEM1, 32) of contactless read head 30 have the form of flat components, welded on a printed circuit board 71 which is mounted in a housing of plastic 70 similar to housing 60. Housing 70 comprises connection pins 72 which coincide with pins 62 of housing 60, for connecting read head 30 to the communication bus of the reader. Thus, the transformation of a conventional card reader only requires mounting housing 70 on housing 60, and welding pins 72 on pins 62.

In the represented example, coil 44 is arranged on board 71 so that it faces micro-unit 54 of contactless card 53 represented in FIG. 2B, when this card is inserted in housing 60. However, an antenna with a larger size radiating a magnetic field in whole housing 60 may be provided, for reading a contactless card comprising an antenna coil of large diameter.

It will be clearly apparent to those skilled in the art that the present invention is likely to have numerous other alternatives and improvements. In particular, the read head according to the invention may be designed in the form of a small size specific chip ("ASIC") comprising an integrated antenna coil, the chip being in this case arranged within the card receiving device, close to the connector.

Furthermore, although the foregoing description relates to the standard ISO 7816, it will be clearly apparent to those skilled in the art that the ideas, principles and characteristics of the invention are transposable without difficulty to other types of card readers, in particular bank card readers using the standard AFNCR.

What is claimed is:

1. A chip card reader comprising:
    a central processing unit comprising means for emitting and receiving, on a communication bus having a single data wire, binary messages having a first format determined by a communication protocol for contact chip cards,
    a card receiving device comprising a contact card connector connected to the central processing unit by means of the communication bus, the contact card connector being therefore connected to said single data wire, and
    a contactless read head for contactless chip card comprising:
        means for receiving or sending, from or to a contactless chip can, messages having a second format determined by a communication protocol for contactless chip cards,
        a serial interface directly connected to said single data wire of said communication bus that carries the binary messages having the first format determined by a communication protocol for contact chip cards,
        means for converting messages received on the serial interface and having the first format into messages having the second format, and, vice versa, converting messages received from a contactless chip card and having the second format into messages having the first format applied on the serial interface, and
        hardware and software arranged so that the contactless read head does not respond to a contact chip card activation command received on the serial interface, and responds to a specific activation command of the contactless read head different from a contact chip card activation command.

2. The reader according to claim 1, wherein the contactless read head is further electrically supplied by a supply wire of the communication bus.

3. The reader according to claim 1, wherein the contactless read head comprises means for being set into an inhibition state at its power-on, and for leaving the inhibition state when receiving said specific activation command.

4. The reader according to claim 3, wherein the central processing unit comprises means for performing the following operations when receiving a detection signal of the presence of a card in the reader:
    sending, on the communication bus, a contact card activation command, and waiting for a first response;
    if the first response is received, establishing or trying to establish a communication with a contact card,
    if the first response is not received in a predetermined time interval, sending said specific activation command of the contactless read head on the communication bus, and waiting for a second response,
    if the second response is received, establishing or trying to establish a communication with a contactless curd.

5. The reader according to claim 4, wherein said contact card activation command is a reset command according to the standard ISO 7816.

6. The reader according to claim 1, wherein said specific activation command of the read head is a command which is likely to be never sent to a contact chip card.

7. The reader according to claim 1, in which the contactless read head is integrated in a small size circuit arranged close to or inside the card-receiving device.

* * * * *

UNITED STATES PATENT AND TRADEMARK OFFICE
CERTIFICATE OF CORRECTION

PATENT NO. : 6,839,772 B1
DATED : January 4, 2005
INVENTOR(S) : Jacek Kowalski and Bruno Charrat It is certified that error appears in the above-identified patent and that said Letters Patent is hereby corrected as shown below:

Column 2,
Line 20, after "embodiment", insert -- , --.
Line 67, after "activation", insert -- command --.

Column 6,
Line 28, delete "commas" and insert -- commands --.
Line 31, delete "comma" and insert -- commands --.
Line 41, delete "AFNCR" and insert -- AFNOR --.

Signed and Sealed this

Thirty-first Day of May, 2005

JON W. DUDAS
*Director of the United States Patent and Trademark Office*